United States Patent [19]

Moran et al.

[11] Patent Number: 4,459,149
[45] Date of Patent: Jul. 10, 1984

[54] PROCESS FOR TREATING HUMUS MATERIALS

[76] Inventors: Edward F. Moran, 274 W. 3rd St., Moorestown, N.J. 08057; Harold A. Hartung, 902 Collings Ave., Collingswood, N.J. 08107

[21] Appl. No.: 423,185

[22] Filed: Sep. 24, 1982

[51] Int. Cl.³ ............................................. C05F 11/02
[52] U.S. Cl. ............................................. 71/24; 44/27
[58] Field of Search .................. 71/24, 23; 44/27, 29, 44/31

[56] References Cited

U.S. PATENT DOCUMENTS

| | | | |
|---|---|---|---|
| 2,093,047 | 9/1937 | Hudig | 71/24 |
| 2,158,918 | 5/1939 | Townsend | 71/24 |
| 2,317,990 | 5/1943 | Grether | 71/24 |
| 2,992,093 | 7/1961 | Burdick | 71/24 |
| 3,321,296 | 5/1967 | Abbe | 71/24 |
| 3,328,158 | 6/1967 | Marks | 71/24 |
| 3,398,186 | 8/1968 | Schwartz | 71/24 |
| 3,603,643 | 9/1971 | Hirota et al. | 44/30 |
| 3,617,237 | 11/1971 | Nagusawa et al. | 71/64.03 |
| 3,694,649 | 7/1972 | Formisano et al. | 71/24 |
| 3,770,411 | 11/1973 | Chambers et al. | 71/24 |
| 4,223,449 | 9/1980 | Bodie | 44/27 |

FOREIGN PATENT DOCUMENTS 7233903 10/1967 Japan ..................................... 71/24

OTHER PUBLICATIONS

"Peat," Reprint from Bulletin 671 Bureau of Mines (1980).
"Peate-Industrial Chemistry and Technology," Academic Press (1980) title page and pp. 136 to 141.

Primary Examiner—Delbert E. Gantz
Assistant Examiner—A. Pal
Attorney, Agent, or Firm—Howson and Howson

[57] ABSTRACT

Peats, mucks, soils, anaerobic sludges, lignites and other humus materials containing humic substances are slurried in the natural wet state with additional water at low pH to free humic acid from salts it may have formed in the natural state and to disperse the humic acid as a fine suspension in the water. The resulting slurry is then screened to remove coarse material such as stones, fibers and cellulosic materials that may be present, and the liquid phase compromising a dispersion of humic acid is settled or otherwise treated to remove heavy inorganic fines if present. The dispersion is then filtered to yield a relatively pure and dry filter cake, comprising crude humic acid. This product may be converted to soluble humate salts by adding a solubilizing agent such as sodium hydroxide, separating residual insolubles and drying the concentrated solution. In the alternative, the solution before drying may be converted to relatively pure humic acid by acidifying the solution, separating and drying the insoluble humic acid. The same solution may be converted to humates of limited solubility by reaction with suitable metal salts, and again separating and drying the product.

21 Claims, 1 Drawing Figure

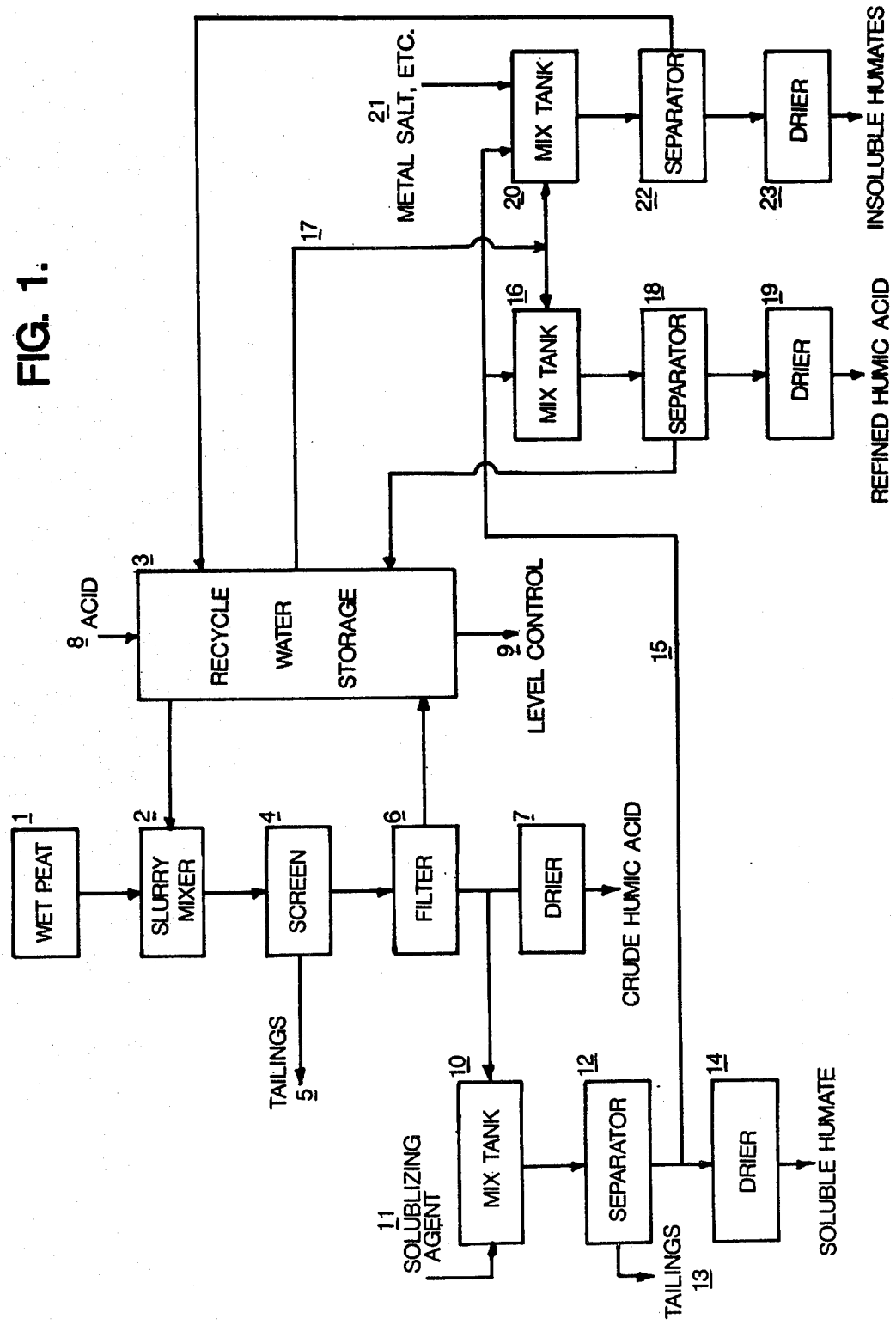

PROCESS FOR TREATING HUMUS MATERIALS

DESCRIPTION

BACKGROUND OF THE INVENTION

Humus, organic matter which is more or less decomposed anaerobically, has long been recognized as a valuable agricultural material. It is formed on the floors of forests from decomposed leaves and other detritus, in soils where agricultural residues are plowed under, on the bottoms of ponds and lakes from organic matter that has grown therein or falls in; it occurs in peat bogs, in lignite deposits and many other types of minerals and soils, such as Leonardite and Aguja. When any of these materials is treated with alkali, an organic fraction called humic substance dissolves. If the resulting solution is acidified to pH 2 to 3, some of the organic matter precipitates; this material is called humic acid, and the portion which remains in solution is called fulvic acid. Humic substance, then, includes both humic and fulvic acids. The former are complex aggregates, with molecular weights commonly in excess of 1000; the latter have lower molecular weights, of the order of several hundred. either are precise compounds, and thus they are defined by the solubility relations given above.

The properties of humic substance are well-known, and have been applied to the laboratory recovery thereof in the form of humic acid and humate salts from all of the humus materials noted above. On a commercial scale, only humus materials free of cellulosic residues, such as lignite, Leonardite and Aguja, have been employed as a source from which humic substance has been recovered. For example, U.S. Pat. No. 2,992,093 describes a process for the alkaline extraction of humic substance from humus materials, preferably Aguja (a soil said to contain 10–45% of humic substance). Also, U.S. Pat. No. 3,398,186 proposes an alkaline salt extraction of lignite or oxidized coal to recover humic substance. Neither of these patents deals with two major practical problems: Firstly, in such humus materials much of the humic acid is present as sparingly soluble salts which must first be hydrolized by acid before they can be solublized to realize the yield potential of the source; and secondly, these processes are completely impractical where the source contains cellulosic residues, as these swell greatly in alkaline medium, making separations very difficult and yields uneconomically low. The only known commercial attempts to produce these materials have been on sources like Aguja, lignite and Leonardite, which are free of cellulosic residues so that the second problem does not exist. None of these processes have been economically successful because of high processing costs and reduced yields associated with the first problem.

A common, cheap and high-yielding source of humic substance, peat, is subject to both problems, and presently there is no commercial production of humic substance in a purified state from this source. In addition, a third cause of failure to realize economic yields of humic substance by the use of prior known processes is the fact that dried humus material has been used as a starting material. Upon drying, the humic fraction of peat loses much of its ability to dissolve and disperse in water, and consequently the desired product, humic substance, is recovered only with added cost and reduced yield.

The significance of the failure of the prior known processes to provide economical supplies of humic substance and its derivatives is great, because the properties of these materials have long been recognized as giving them substantial agricultural value. In addition, a number of non-agricultural uses for humic substance have been found as a result of laboratory work. These applications have not been developed due to the lack of an economic supply of humic substance and its derivatives.

SUMMARY OF THE INVENTION

We have discovered a process for treating humus materials to recover humic substance, which process comprises freeing humic acid from the combined state in which it frequently exists in humus materials, dispersing it as a fine insoluble solid in acid process water, separating it from the impurities with which it is associated and recovering it as a high-solids filter cake which can be dried for use or further processing. Compared to conventional prior known processing methods, yields are higher, equipment required is simpler and costs are greatly reduced.

In accordance with the present invention, the humic substance raw material is used as it occurs naturally, requiring no drying and usually no grinding. It is mixed with enough process water to form a fluid slurry, the mixture being maintained at or near its isoelectric point, which is generally below about pH 3, by the addition of acid to the process water. Free humic acid present in the source disperses readily as a fine material in the process water, and humic acid which is present in the source material as metallic salts which are only sparingly soluble is freed and also disperses in very fine form. These actions occur rapidly, so that prolonged contacting of the humus material with the process water is not necessary. The resulting slurry is then screened to remove coarse particles, which may be sticks, stones, fibers, undecomposed vegetation, etc., depending on the source. If the quantity warrants, screen tailings may be washed with more process water to improve yield. The screened slurry may, if the nature of the source so indicates, be settled briefly to allow heavy mineral fines, such as soil particles if present in substantial quantity, to precipitate out. The supernatant slurry of organic material is then drawn off and filtered.

The slurry under these conditions filters rapidly under vacuum to a relatively dry cake, generally comprising 30% or more by weight of solids. The filtrate is returned to process water storage for treating further charges. The filter cake may be dried at this point to yield a humic acid of about 95% purity, which is excellent for agricultural purposes, and of high activity due to its freedom from humate salts. Drying may be accomplished in any convenient manner. It is a distinct advantage of the process of this invention that the humic substance prior to filtration is at or near its isoelectric point and by reason thereof filters and dries at substantially higher rates than similar humic substance which has not been so treated.

The temperature of the mixture of humus material and water is not critical, and ambient conditions provide satisfactory results. However, if the supernatant slurry of organic material is at somewhat elevated temperatures on the order of 100° to 150° F. the solids content of the filter cake may be somewhat increased.

In a preferred embodiment of the present invention, the humus material used in the process is peat. It has been found that peats of all types ranging from about 20 to more than 90% by weight, of humic substance, may be processed efficiently by the method of this invention. A most preferred embodiment of the present invention uses highly decomposed peat, containing more than 70% humic substance, as the feed material, and processing is done at or near the isoelectric point, which is about pH 2.3 generally, to achieve maximum economy in operation. With a source of this character, screening is easy, washing of the tailings is not required, and there is no need to settle the screened slurry to remove soil minerals.

After the slurry has been filtered, thereby concentrating the humic substance, it may be converted easily to soluble humate by reaction with a solublizing agent such as sodium hydroxide, ammonia, etc. At this point insolubles which have passed through the screen earlier may be removed by settling, filtering, centrifuging or other means. The resulting high-purity, concentrated solution may be dried by any convenient means, such as spray drying, or it may be converted into pure humic acid by treatment of the humate solution with acid. Dilution with acid process water is a suitable method, the insoluble humic acid being separated from the process water, which is then returned to storage for re-use. The purified solution of soluble humate may also be converted to relatively insoluble forms by reaction with metal salts or other selected agents; again, process water may be drawn from storage for conducting the reaction and returned to storage after it is complete.

While the process of the present invention is described in terms of its ability to recover valuable humic substance in a highly economical manner, the same process may be used to satisfy different needs. Many sludges and sediments resist de-watering so strongly that it is difficult to concentrate them by filtration to more than about 10%, by weight, of solids without expensive treatment. Using the process of the present invention much greater de-watering may be achieved at substantially lower cost, and filter cakes so produced have been found to filter and dry more rapidly than if not processed at or near the isoelectric point. In the other cases, the primary objective may be to lower the water or ash content of a source so that it may be burned or carbonized more effectively; both of these objectives may be realized by using the methods of the present invention. Other applications of these methods will be apparent to those skilled in the art.

DETAILED DESCRIPTION OF THE INVENTION

Humus is a natural element in the cycle of growth and decay of vegetable material. It is formed in nature wherever anaerobic decomposition of such matter takes place, and by man wherever he imposes anaerobic decomposition conditions on organic matter, as in the generation of composts and certain sludges. The term "humus" or "humus material" is generally accepted to mean a source material containing humic substance (humic plus fulvic acids) as well as undecomposed organic residues, which may be sticks, fibers, leaves, cellulosic fragments, seeds, spores, etc. In virtually all cases there will be some contributions from animal life, ranging from microorganisms through insects to marine animals; the degree to which these contributions occur depends on the circumstances under which the humus is formed, but such contributions generally are small compared to the vegetative sources.

As defined earlier, humic acid is that fraction of the organic content of humic substance of a source which is soluble in alkali and insoluble in acid. Fulvic acid, on the other hand, is soluble in both alkali and acid. Much effort has been directed at characterizing these acids because of their widespread occurrence and great importance in nature. At this time, it is generally accepted that humic acids are strong aggregates of smaller molecules that show a combined molecular weight in excess of 1000 (12–1300 usually) per single aggregate as the material exists in nature in the wet state. Under some circumstances these aggregates combine to exhibit much higher molecular weights. Fulvic acid, on the other hand, has a molecular weight generally found to be around 400 in the natural wet state. It, too, can combine to form aggregates of much higher molecular weight in certain circumstances. These differences in molecular weight in large measure explain why fulvic acid is soluble in water and humic acid is not. Molecules of both acids contain carboxyl and hydroxyl groups, although usually in somewhat different proportions. It should be reiterated that neither of these acids is a discrete chemical compound; rather both are defined by the solubility parameters given above.

Some humus materials are highly organic; peats, composts, brown coal and the upper portions of pond sediments fall in this category. Other humus materials are highly inorganic, like soils. Still others are mixed, like Aguja, Leonardite, and the lower portions of pond sediments. Lignites range in organic content from moderately high to very high whereas anaerobic sludges can be extremely variable in organic content. Because of the very hydrophilic character of humic acid in nature, sources rich in it have a great ability to hold water. Materials like peats, composts and some sludges and sediments, which also contain much cellulosic residue, often contain 80 to 90% or more by weight, of water when drained to equilibrium. Humus materials that are more highly mineralized show this character to a lesser degree. Physical properties, then are seen to vary widely with the composition of the humus material.

Humic acid is a potentially useful material, and some of its uses in agriculture are well documented. These uses are now filled by whole peat containing about 50% humic acid. Other uses for humic acid and its derivatives in agriculture and industry have been explored but not exploited due to the lack of a suitable source of purer forms of humic acid. Beyond these, additional applications have been visualized but not yet demonstrated. The development of an economic source of humic acid is important for another reason; namely, replacement of petrochemicals in a number of areas. It is estimated that one ton of humic acid has the potential to conserve up to 15 barrels of oil if so used.

Apart from the desirability of making humic acid available as an article of commerce, certain sources of humic substance present serious handling problems for which no good solution exists. These pertain chiefly to lowering the water content of these very hydrophilic materials, and processing of humus materials according to the present invention makes possible substantial improvements in reducing water content in these materials by providing faster filtration and drying rates. Examples of such applications of the invention are dewatering of peat for direct burning as fuel or as feed to a gasification or other conversion process, and the dewatering of certain organic sludges to permit more cost-effective disposal (some sewage sludges fall in this category).

To explain the process in greater detail, it will be described in connection with recovering humic substance from peat, as this operation requires the most general use of all facets of the present invention. However, it is to be understood that the process is applicable to processing humus materials generally.

It was found, quite unexpectedly, that peat humic substance, which is very hydrophilic in the natural wet state, loses much of this character when dried. The degree of which this happens depends on the level of drying which takes place. In the usual air-drying of peat, for example, to 20% moisture or less, the loss of ability to retain water and hence to re-disperse in water is 75% or more. The reason for this is believed to be the irreversible nature of the drying of both humic and fulvic acids, particularly when accompanied by oxidation, both acids being strong reducing agents. As these materials dry from their natural wet state, in which peat humic acid exhibits a molecular weight of 12-1300 and peat fulvic acid a molecular weight of about 400, the molecules tend to agglomerate. The more strongly this agglomeration process occurs, the more difficult it is for the agglomerates to re-wet and disperse or dissolve. For example, in an extreme case, strongly dried fulvic acid has been found to have an average apparent molecular weigh of about 6000, with a small fraction of the material close to four million. Humic acid shows the same sort of behavior. Such high molecular weight material will not re-wet and dissolve or disperse as freely as the same material does in its natural, wet, low-molecular-weight condition. This phenomenon which applies to peats and pond sediments, is believed to apply to other sources of humic substance as well, since all humic substance derives basically from the same type of humus material (vegetation) through the same process (anaerobic decomposition). Consequently, in the process of this invention dried humus materials should be avoided and only sources substantially in their natural wet state should be used as feed material to obtain the maximum benefits from the process.

BRIEF DESCRIPTION OF THE DRAWING

Referring to FIG. I, undried, wet peat 1 is brought from the bog and transferred to a mixing vessel 2 where it is mixed with acidified water from recycle water storage 3. Mixing is carried out for 5 to 30 minutes, preferably about 10 minutes, until all the peat charged to the mixer has been intimately dispersed and the humic acid portion has been freed from any salts it has formed and is dispersed in the process water in fine form. The intensity of mixing and degree of recirculation, as well as the physical and chemical nature of peat, will influence the mixing time needed. The contents of the mixing tank should have a pH in the range of 1 to 6, preferably, 2 to 3, and be at ambient temperature. The amount of process water used may range from about one to ten, preferably two to five times the weight of the wet peat charged to the mixer 2, depending on the nature of the peat; about four times as much water as wet peat by weight is usually particularly preferred. This mixing provides a screenable slurry which, when passed over the screen 4 permits the water carrying fulvic acid in solution and humic acid in suspension to pass through, leaving tailings 5 which contain a minimum of the humic acid fines. If the amount of tailings in the peat source is high, a washing stage using recyled process water from storage facility 3 may be installed in the screening section to recover more of the desired humic acid. The screen mesh size of screen 4 will depend on the composition of the peat to some degree. If the screen is too coarse, too many impurities will pass therethrough; if too fine, yield and throughput will be reduced. Laboratory experience indicates that a 40 mesh screen is a good compromise for most materials, although screens in the range of 10 to 60 mesh generally can be used.

If the feed to the process contains substantial amounts of fine soil particles which will pass through the screen, brief retention of the screened suspension in a quiescent state will permit the soil particles to settle out. Generally, peats do not contain enough soil particles to require this treatment.

The screened suspension next passes to filter 6. Any type of pressure or vacuum filter is suitable for this operation, but on economic grounds, a rotary vacuum filter is generally preferred. Suspensions of humic substance derived from peat filter well on this type equipment, if properly engineered and operated, and the resulting filter cake will comprise about 35% solids. If drier filter cakes are desired, a pressure filter such as a filter press may be used. With any filter, but particularly with pressure filters, it may be economically desirable to store the screened suspension for 24 hours or so before filtering. During this period settling occurs which allows some of the process water to be decanted. The residual concentrated suspension or slurry can then be filtered more rapidly to a drier cake, with lower pumping cost and more rapid filter turn-over. Filtrate is returned to recycle water storage 3. Any wash-down water required for screen 4 and filter 5 may be returned to mixer 2.

Recycle water storage 3 is maintained at a low pH by the addition of acid to achieve a pH level of 2 to 3 in slurry mixer 2, so continuous monitoring of storage water pH level should be maintained. How long the process water can continue to be recycled is dependent on the humus material feed, for this water will tend to become saturated with respect to fulvic acid, as well as calcium and magnesium salts if present in the peat, and possibly other materials. Since the peat feed is normally wetter than the humic substance from filter 6, there will be a constant increase in the amount of process water in the system, and thus the need to withdraw some water continuously or periodically to maintain a given level in storage vessel 3. Such procedure will act like a blow-down to help keep the solutes levels under control.

The selection of acid for controlling pH in the 1 to 6, preferably 2 to 3 range is not critical, and any acid, usually a mineral acid such as sulfuric, hydrochloric, nitric and phosphoric acid, or an organic acid such as acetic and formic acid, that will bring the system to the pH required to free humic acid from its salts and disperse the humic acid in a manner that filters well, and gives a filter cake sufficiently dry for the purposes of this process may be used. There may, however, be other factors which will dictate the choice of acid, such as cost, the mineral content of the feed peat, the use to which the humic substance product will be put, environmental considerations, local availability, etc. One other factor which may affect the choice of acid used to control process pH is the recovery of fulvic acid from the process water. To control process water level, a certain amount of water will have to be removed from the system, as explained above. This water will contain certain amounts of fulvic acid, the recovery of which may be of scientific and even commercial interest. If fulvic acid is to be recovered, the manner in which this is accomplished may dictate the choice of acid for the main process.

For the production of crude humic acid, the filter cake passes to the drier 7. While this product is termed "crude", it generally contains 95% humic acid plus fulvic acid. Up to this point processing has all been wet, and the humic substance at any stage is substantially un-aggregated, as it exists in nature in the peat or other source. It is frequently desirable to dry the humic acid in such a manner that a minimum degree of aggregation will occur, so that the finished dry product will be as close as possible to its natural state, thus rendering the fulvic acid component more soluble, the humic acid component more dispersible, and both components more active and effective than humic substance produced in a manner which permits aggregation to occur. It has been found that rapid drying under mild temperature conditions is best to achieve such a product on a commercial scale. Rapid drying is greatly facilitated by processing peat at or near its isoelectric point, i.e. about pH 2 to 3. In addition to starting the drying operation with a filter cake of lower moisture content, the rate of moisture loss for such a cake is higher than for a cake processed at pH levels more remote from the isoelectric point. Flue gas or other inert gas in a tunnel drier at 100° to 160° F. may be used to reduce the moisture content of the filter cake to 30–50%. A moisture content of about 40% is preferred, because at this level of moisture most filter cakes of humic substance obtained by the process of the present invention can be easily crushed to a fine powder. If the cake is substantially wetter, it may be sticky; if it is much drier, it becomes harder and requires grinding, with much greater energy input and thus increased costs. In tests with vacuum filter cakes of about 70% moisture, drying to the above desired level in a stream of gas moving at about five feet per second requires about 15 minutes at 100° F. and about three minutes at 160° F. At the preferred temperature of 140° F., drying to 40% moisture requires about five minutes. If a pressure filter is used under sufficient pressure, cakes may be dry enough to eliminate the drying step and permit direct crumbling of the cakes to a fine moist powder. In any event, once the product is crushed to a fine powder containing about 40% moisture, final drying can best take place in a stream of warm inert gas in equipment terminating in a cyclone or other dust collector to recover the fine, dry product. This part of the process is rapid and efficient and does not adversely affect the product to any substantial degree.

Inert gas drying is preferred in order to reduce the adverse effects of oxygen on the product. It has been found that oxidation reduces the rewetting ability of humic substance, and thus its ability to redisperse upon subsequent wetting of the dry product. Oxygen uptake is more severe in alkaline processed material, and the acid conditions employed in the process of the present invention minimize this adverse reaction. Nevertheless, it is preferred to conduct the drying step with a gas stream of reduced oxygen content in order to minimize oxidation.

Referring to FIG. I, soluble humates can be produced from humic substance filter cake by mixing the cake with a solublizing agent 11 in mixing tank 10. Suitable solublizing agents include ammonium, potassium and sodium hydroxides and alkaline salts, amines, alkanolamines, etc. The humic and fulvic acids go into solution as the corresponding salts, and any insoluble inert materials which pass through the screen 4 and are present in the filter cake may be removed in the separator 12. This device can be a settling tank or small filter, depending on the nature and amount of insoluble material to be removed before the solution is dried in drier 14. Obviously, in light of the discussion of the effects of oxidation above, precautions should be taken to guard against it in this part of the system, mix tank, separator and drier. For most products of the soluble humate type, spray drying is preferred. The solution leaving separator 12 is high enough in concentration to be spray dried without further evaporation, which is a very substantial advantage in product quality, operating cost and capital investment. Other drying methods may be used, however, as circumstances dictate.

The soluble humate solution leaving separator 12 may be diverted through line 15 to another mixing tank 16 to be converted to refined humic acid, with a purity exceeding 99% of humic plus fulvic acid. In most instances, the humic acid content of this product will exceed 95%. This conversion is made by acidifying the solution with process water from line 17, thorough mixing, transferring the slurry to separator 18, returning process water to storage 3 and moving wet cake to drier 19. Separator 18 is preferably a rotary vacuum filter, and drier 19 is preferably similar in design to dryer 7.

Another class of products can be made from the soluble humate solution leaving separator 12. These are termed "insoluble" humates. More precisely, they are humates of very low solubility, for instance, similar to the metal salts that are found in soils, which are responsible for storing and moving trace metals through the soil to become available for use by growing plants. To make such salts and other derivatives of limited solubility, the solution from separator 12 is brought through line 15 to mixing tank 20, where it is blended with process water from line 17 and an appropriate metal compound or other agent 21. The appropriate metal compound depends on the use for which the product is intended. For agriculture, divalent metals like zinc, copper, manganese, iron, molybdenum, etc., are useful, and any compounds of these metals which are soluble in the process water, including oxides and hydroxides, which react with the humic and fulvic acids to form the desired product as a less soluble precipitate may be used. The acid character of the process water is of definite value in conducting this reaction. Other insolublizing agents may be used, again depending on the purpose for which the end product is intended. Reactions in mixing tank 20 may be somewhat slower than in other parts of the system, so a slightly longer retention time may be necessary. Many of these less soluble materials settle rapidly, so that mixing tank 20 can be used as a decanter in many cases. The slurry then flows to separator 22, which preferably is a rotary vacuum filter or pressure filter, and filtrate is returned to storage 3 and filter cake transported to drier 23. This drier is preferably similar to drier 7. However, longer retention times may be required as most of the cakes from separator 22 will be relatively wet, though not difficult to handle.

While the foregoing disclosure and description of the present invention has described the processing of wet peat to make humic substance and related derived products, it will be obvious to one skilled in the art that the process of this invention can be applied to other wet humus materials, lean or rich in humic substance content, either to produce humic substance, with or without related derived products, or to realize the benefits conferred by the process of the present invention in the processing of humus materials that are otherwise handled only with great difficulty, or both.

The following examples are given by way of illustration and are not intended to in any way limit the scope of this invention.

EXAMPLE 1

This example describes the prior known method for alkaline treatment of humus material.

A highly decomposed peat muck from North Carolina was air-dried to 20% by weight, of moisture, then ground to a fine dry powder. To 100 grams of this peat, containing 80 grams of peat solid, and 600 grams of water were added 16 grams of sodium hydroxide. The batch was well mixed, and allowed to stand for 24 hours with occasional mixing. The pH of the resulting slurry was 11.5 after equilibrating. 24 hours later the batch was vacuum filtered over a period of about four hours, finally yielding 400 grams of filtrate containing 7.5% organic solids, or 37.5% of the dry material charged to the test.

EXAMPLE 2

The same North Carolina peat muck as used in Example 1 was taken directly from the bog, at 80%, by weight, of moisture. 150 grams of the muck, containing 30 grams of peat solids, were mixed with 600 grams of water for 10 minutes. The resulting slurry which had a pH of 4 was passed through a 40-mesh screen which retained cellulosic fibers, but allowed the humic acid in suspension to pass through. This suspension was brought to pH 9 by adding sodium hydroxide, at which point it became a dark solution with a trace of sediment. The recovered solution weighed 713 grams and had an organic solids content of 4.0%, indicating recovery of 28.5 grams, or a yield of 95% of the peat solids in the initial charge.

The particular peat used in this example does not require acid treatment to free humic acid from its salts, because the humic acid is already in a relatively free state. Comparing the results obtained in Examples 1 and 2, the advantages of the present invention over the prior process in terms of ease of processing, yield and cost are very apparent.

EXAMPLE 3

A New Jersey reed and sedge peat of moderate decomposition comprising 73.7%, by weight, of moisture, was slurried with water in the proportions of 150 grams of peat to 600 grams of water (1:4). The slurry, which had a pH of 6.9, was mixed for 20 minutes, then passed to a 40 mesh screen. 606 grams of filtered suspension was obtained, which suspension, upon addition of sodium hydroxide thereto, turned to a clear dark liquor of 10.9 pH. The solution was found to comprise 0.67% organic matter, indicating a recovery of 10% from this peat.

EXAMPLE 4

The same New Jersey reed and sedge peat as used in Example 3 was processed according to the present invention: 100 grams of the peat were mixed with 400 grams of water and 5 grams of concentrated sulfuric acid, which brought the pH of the suspension down to 2.1. After mixing for 20 minutes, the suspension was passed to a 40 mesh screen, and the liquid phase was collected and filtered under vacuum. Filtration was very rapid, and the filter cake was 28%, by weight, solids. The filter cake was brought to pH 10 with sodium hydroxide solution, at which time it became a dark, bright solution containing only a small amount of fine insoluble material. Recovery of soluble organic material from the original charge was 50%.

Comparing Examples 3 and 4, the advantage of acid processing is immediately apparent. With use thereof, the yield increased 5 fold, and all processing steps are rapid and efficient.

EXAMPLE 5

100 grams of the North Carolina peat muck of Examples 1 and 2, at 80% moisture, were mixed with 400 grams of water and aged over night. The resulting slurry, which had a pH of 4.2, was then vacuum filtered over four hours, and gave a filter cake of 80% moisture.

EXAMPLE 6

The procedure of Example 5 was repeated four more times, with the modification that five grams of a different acid was included in each of the respective slurries. The results obtained are set forth in Table I, below:

TABLE I

| | Effect of Various Acids on Filter Rates and Filter Cake Solids Obtained | | | |
|---|---|---|---|---|
| TEST | ACID | SLURRY pH | FILTER TIME (min) | CAKE SOLIDS (wt %) |
| A | Sulfuric - 93% | 1.7 | 40 | 25 |
| B | Phosphoric - 75% | 2.3 | 50 | 25 |
| C | Hydrochloric - 37% | 1.8 | 40 | 25 |
| D | Nitric - 71% | 1.7 | 50 | 24 |

While acid is not needed with this peat to free combined humic acid, its presence increases filtration rate and drier, more concentrated filter cakes are obtained. These facts are apparent from a comparison of the results obtained in Examples 5 and 6. The present example also shows that any common mineral acid may be used to obtain the desired low pH.

EXAMPLE 7

To evaluate the yield of humic substance from various humus materials, such materials were acid treated to reduce the pH of the water slurry to 2 to 3, then titrated with that amount of standard sodium hydroxide solution required to increase the pH from 4 to 10, from which the humic substance content can be determined, indicating potential or theoretical yield. Table II shows the theoretical yield for some representative peats thus obtained, along with actual process yields using the process of the present invention:

TABLE II

| | | Theoretical Yield and Actual Recovery of Humic Substance from Peats | | |
|---|---|---|---|---|
| PEAT | SOURCE | TITRATION | THEORETICAL EXTRACTABLE | ACTUAL RECOVERY | RECOVERY EFFICIENCY |
| 1 | N. Carolina | 2.93 meq/g* | 95% | 90% | 95% |

TABLE II-continued

| | | Theoretical Yield and Actual Recovery of Humic Substance from Peats | | | |
|---|---|---|---|---|---|
| PEAT | SOURCE | TITRATION | THEORETICAL EXTRACTABLE | ACTUAL RECOVERY | RECOVERY EFFICIENCY |
| 2 | New Jersey | 2.13 | 69% | 60% | 87% |
| 3 | N. Carolina | 2.01 | 65% | 50% | 77% |
| 4 | Saskatchewan | 1.92 | 62% | 45% | 73% |
| 5 | Minnesota | 1.55 | 50% | 35% | 70% |
| 6 | Minnesota | 1.25 | 40% | 25% | 62% |

*milliequivalents per gram of dry peat solids

While all of these recovery efficiencies are acceptable, it is apparent that more highly decomposed materials (higher titration) are more attractive raw material sources. Recovery efficiencies of the leaner peats (lower titration) can be improved by adding washing stages to the screening step, as the lowering of efficiency of recovery in these cases is due to hold-up of desired fine particles of humic acid on the more massive screen tailings.

EXAMPLE 8

A moderately decomposed North Carolina peat was slurried in water, acidified, screened and filtered, and the filter cake was brought to pH 9.5 with sodium hydroxide. The resulting solution was settled to effect precipitation of a small amount of insolubles which had passed through the screen. A portion of the solution was then treated with water acidified with sulfuric acid, which dropped the pH to 3. Humic acid precipitated from the solution and was recovered by settling, filtration and drying. This example illustrates the production of crude humic acid, and from it, soluble humate and refined humic acid, using acid process water in this last conversion.

EXAMPLE 9

Another portion of the soluble humate solution of 9.5 pH from Example 8 was treated with acidified water and zinc chloride solution, the mixture coming to 3.5 pH. Insoluble zinc humate was formed at once, initially as a very fine dispersion but becoming filterable within less than 30 minutes. The suspension filtered easily to give a cake of high water content. This cake air-dried with substantial shrinkage to give small dark chunks of zinc humate, insoluble in water but soluble in aqueous ammonia. This example illustrates the conversion of soluble humates to insoluble salts using metal salts and acid process water.

EXAMPLE 10

A sample of muck from the bottom of a pond was taken at a point where the depth of the water was about one foot. This material is estimated to be 2-5 years old, and consists of clay soil minerals, humic substance and undecomposed organic residues of plant and aquatic animal origin. The muck equilibrates to 36.3% solids and 6.2 pH. A 200 gram sample of the muck containing 72.6 grams of solids, was diluted with 300 grams of water and five grams of concentrated sulfuric acid, bringing the resulting mixture to a pH of 2.1. It was then passed to a 40-mesh screen, and the suspension of fine material which passed through the screen was readily vacuum filtered to give a very dry cake of 61.3% solids. The cake recovered by screening and filtering contained 60.3% of the solids charged (43.8 grams); that is to say, 39.7% of the charged solids (28.8 grams) were removed by screening. The filter cake was brought to pH 10 with sodium hydroxide solution and the resulting liquor was dark and bright, with light-colored clay settling softly at the bottom of the container in a condition which was easily filterable. The dark solution contained 8.1 grams of humic substance, which represents 11.1% of the solids charged to the process. In a parallel test run without the addition of acid, the filter rate was substantially slower, filter cake solids were only 56%, and recovery of humic substance was about half that obtained with the acid solution.

EXAMPLE 11

Highly decomposed peat muck of 80% moisture content was slurried with four times its weight of water and the slurry was passed over a 20 mesh screen to remove fibers. The screened slurry at 4.2 pH was divided into equal parts which were adjusted to various pH levels with sulfuric acid as shown in Table III; each sample was then vacuum filtered and the filtration time was recorded:

TABLE III

| Sample | pH | Filtration time, min. |
|---|---|---|
| A | 4.2 | 240 |
| B | 2.5 | 42 |
| C | 2.35 | 37 |
| D | 2.3 | 29 |
| E | 2.1 | 33 |
| F | 2.0 | 36 |

At the isoelectric point, 2.3 pH, it is apparent that filtration rate is substantially greater than at higher or lower pH levels; the improvement in filtration rate is especially notable compared to that at higher pH levels.

EXAMPLE 12

Filter cakes A and D from Example 11 were subjected to drying rate tests; cake A was initially at 80% moisture (4# water/#solids) and cake D was at 73% moisture (2.7# water/#solids). Both cakes were dried in a stream of air at 100° F., moving at 5 ft/sec. Table IV shows the drying rates observed at various equal cake moisture contents:

TABLE IV

| Moisture Content #Water/#Solids | Rate of Moisture Loss in Drying (#/min.) | |
|---|---|---|
| | Cake A (4.2 pH) | Cake D (2.3 pH) |
| 1.5 | 0.043 | 0.077 |
| 1.0 | 0.033 | 0.048 |
| 0.5 | 0.011 | 0.036 |
| Span. 1.5–0.5 | 38 minutes | 21 minutes |

This example shows that the cake produced at the isoelectric point, 2.3 pH, which is lower in moisture content than a cake produced at higher pH, also dried more rapidly than the higher pH cake. This combination of advantages is very significant in its effect on process economics.

We claim:

1. A process for treating humus material to recover humic substance therefrom which comprises mixing humus material substantially as it occurs in nature with from about 1 to about 10 times its weight of water to obtain an aqueous suspension of humic substance containing coarse particles, said water being sufficiently acidic to provide said suspension with a pH of from about 2 to about 3, removing said coarse particles from said suspension, and reducing the water content of said suspension to obtain a solid product comprising humic substance.

2. The process according to claim 1 in which said humus material is combined with about 2 to about 5 times its weight of water.

3. The process according to claim 1 in which said humus material comprises a peat containing from about 20% to about 90%, by weight, of humic substance, on a dry basis.

4. The process of claim 3 in which said humus material is a peat comprising more than about 70%, by weight, of humic substance, on a dry basis.

5. The process according to claim 3 or 4 in which said aqueous suspension has a pH which is at about the isoelectric point of the humic acid component of said humic substance.

6. The process according to claim 1 in which said humic substance is separated from said suspension by filtration under vacuum to yield a cake of 30% or more, by weight, of solids.

7. The process according to claim 6 in which the humic substance filter cake is dried at a temperature of about 100° to about 160° F. in the presence of an inert gas.

8. The process according to claim 5 in which the pH of said aqueous suspension is adjusted to the isoelectric point of the humic acid component by addition of an acid.

9. The process according to claim 8 in which said acid comprises sulfuric acid.

10. The process according to claim 1 in which the water with which the humus material is combined comprises process water recycled after separation of humic substance.

11. The process according to claim 10 in which said recycled process water has a pH approximately equal to the isoelectric point of the humic acid component of the humic material.

12. The process according to claim 6 in which humic acid in said humic substance obtained by filtration is converted to soluble humate by reaction with an alkaline reagent.

13. The process according to claim 12 in which soluble humate is converted to substantially insoluble humate by reaction with a compound which forms a substantially insoluble humate.

14. The process according to claim 12 in which said soluble humate is converted to humic acid having a purity of at least 95% by treatment of an aqueous solution of said soluble humate with an acid.

15. The process according to claim 1 in which said solid product is subjected to drying conditions to reduce the moisture content of said product.

16. A process for treating peat to recover humic substance therefrom which comprises mixing a peat substantially as it occurs in nature and containing from about 20% to about 90%, by weight, of humic substance, on a dry basis, with about 2 to about 5 parts by weight of water to obtain an aqueous suspension of humic substance containing coarse particles, said water being sufficiently acidic to provide said suspension with a pH of from about 2 to about 3, removing said coarse particles from said suspension, and subjecting said suspension to filtration to obtain a filter cake containing more than about 30 percent, by weight, of solids.

17. The process according to claim 16 in which said peat comprises more than about 70%, by weight, of humic substance, and said aqueous suspension has a pH which is at about the isoelectric point of the humic acid component of said humic substance.

18. The process according to claim 17 in which humic acid in said humic substance is converted to soluble humate by reaction with an alkaline reagent.

19. The process according to claim 18 in which said soluble humate is converted to humic acid having a purity of at least 95% by treatment of an aqueous solution of said soluble humate with an acid.

20. The process of claim 18 in which said soluble humate is converted to substantially insoluble humate by reaction with a compound which forms a substantially insoluble humate.

21. The process according to claim 16 in which said filter cake is subjected to drying conditions to reduce the moisture content of said cake.

* * * * *

UNITED STATES PATENT AND TRADEMARK OFFICE
CERTIFICATE OF CORRECTION

PATENT NO.   : 4,459,149
DATED        : July 10, 1984
INVENTOR(S)  : Edward F. Moran and Harold A. Hartung It is certified that error appears in the above-identified patent and that said Letters Patent are hereby corrected as shown below:

Column 11, Table II should read as follows:

TABLE II
Theoretical Yield and Actual Recovery of Humic Substance from Peats

| PEAT | SOURCE | TITRATION | THEORETICAL EXTRACTABLE | ACTUAL RECOVERY | RECOVERY EFFICIENCY |
|---|---|---|---|---|---|
| 1 | N. Carolina | 2.93 meq/g* | 95% | 90% | 95% |
| 2 | New Jersey | 2.13 | 69% | 60% | 87% |
| 3 | N. Carolina | 2.01 | 65% | 50% | 77% |
| 4 | Saskatchewan | 1.92 | 62% | 45% | 73% |
| 5 | Minnesota | 1.55 | 50% | 35% | 70% |
| 6 | Minnesota | 1.25 | 40% | 25% | 62% |

*milliequivalents per gram of dry peat solids

Signed and Sealed this

Twelfth Day of February 1985

[SEAL]

Attest:

DONALD J. QUIGG

Attesting Officer    Acting Commissioner of Patents and Trademarks